Oct. 26, 1971  SHIGEO TAKEUCHI  3,614,800
CAR BODY WASHING APPARATUS

Filed April 3, 1969  8 Sheets-Sheet 1

INVENTOR
Shigeo Takeuchi

BY  Karol W. Flocks

ATTORNEY

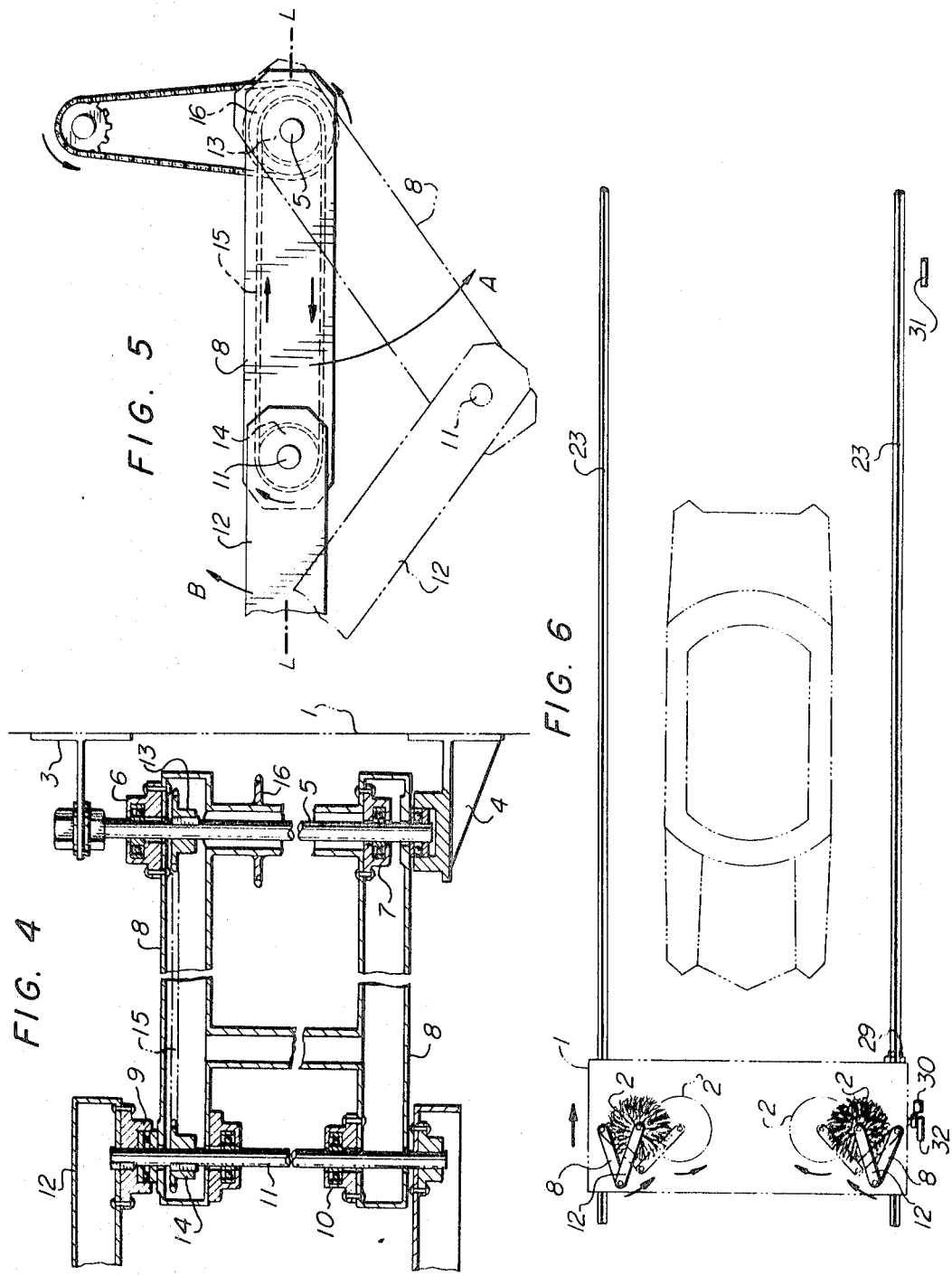

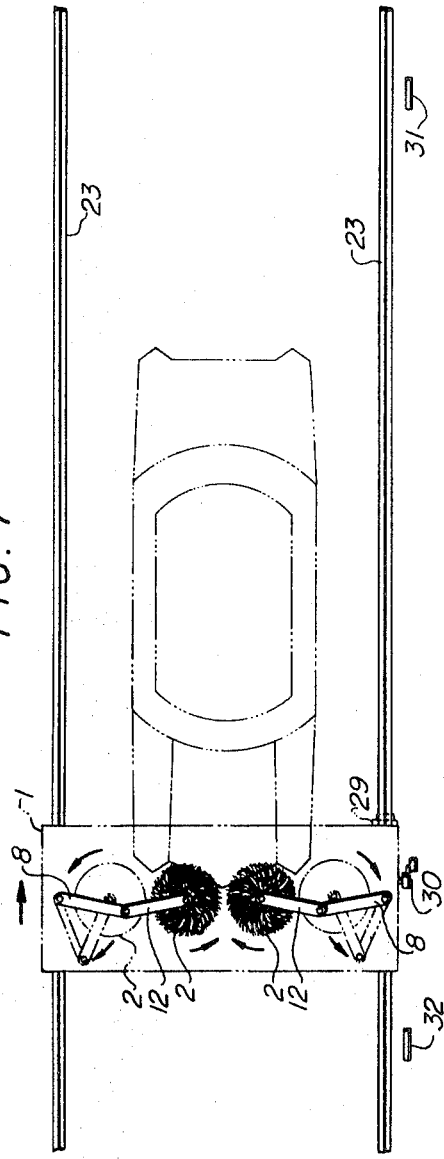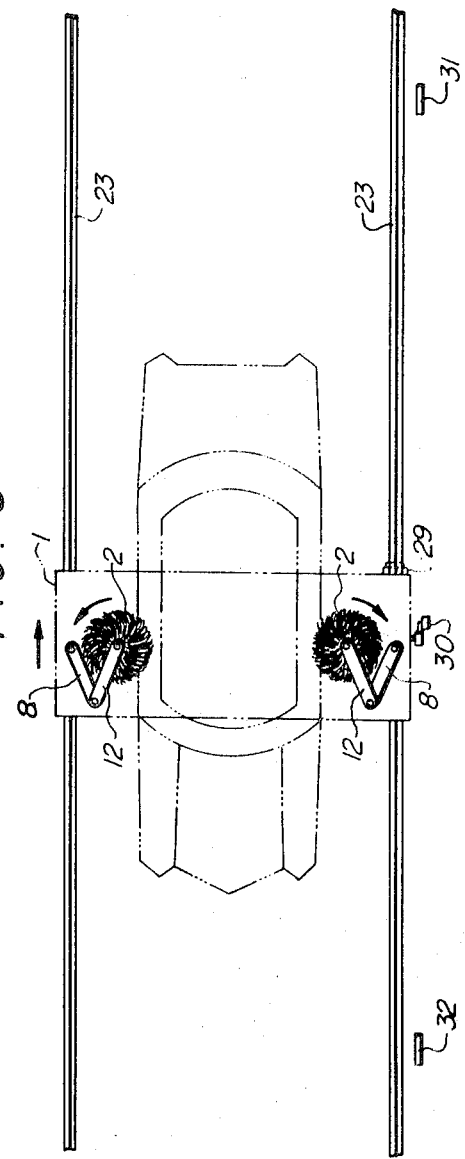

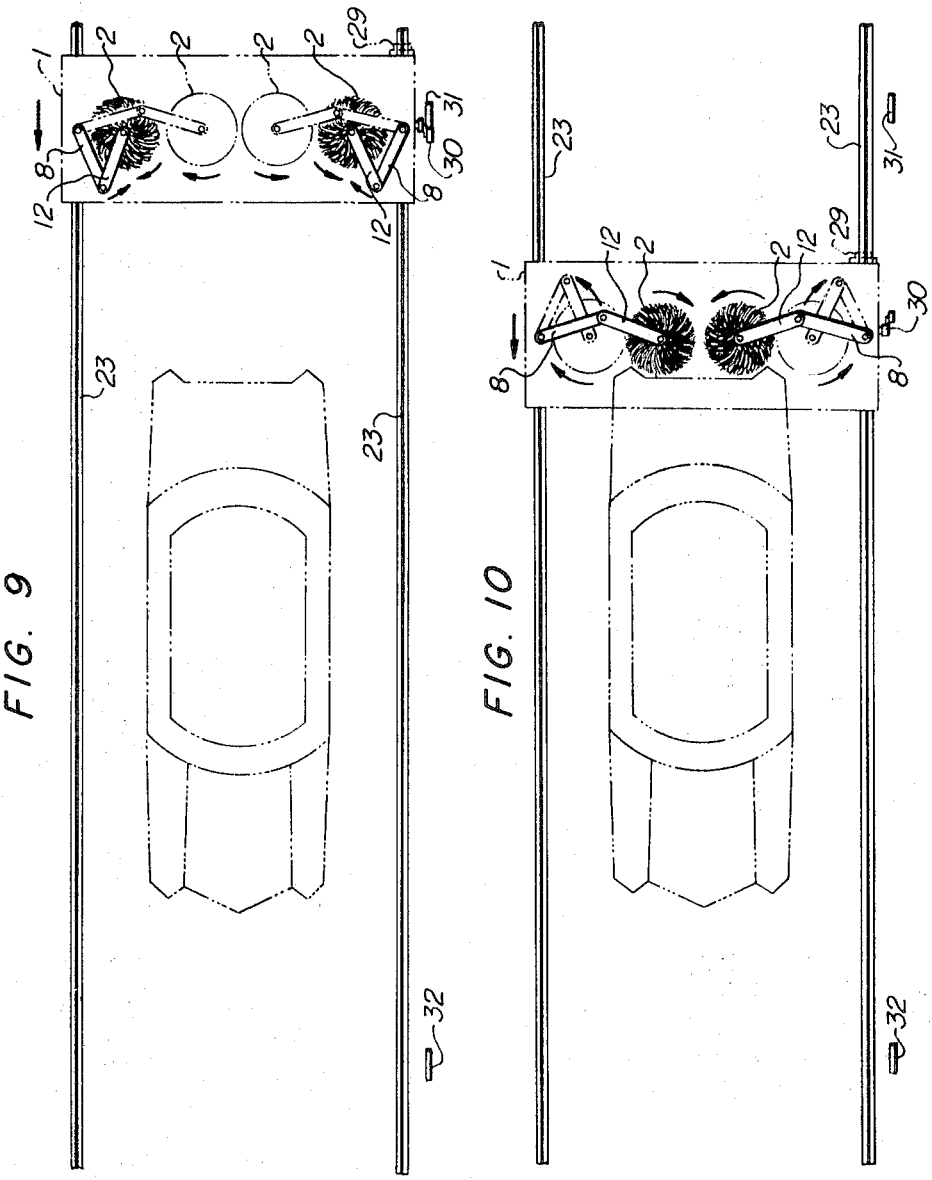

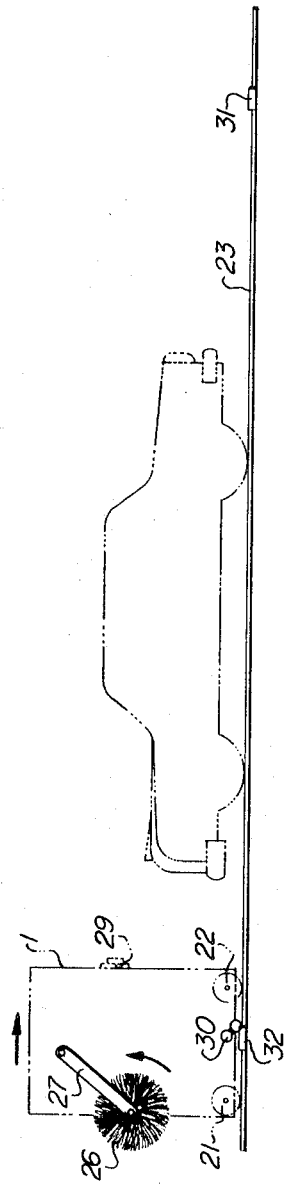
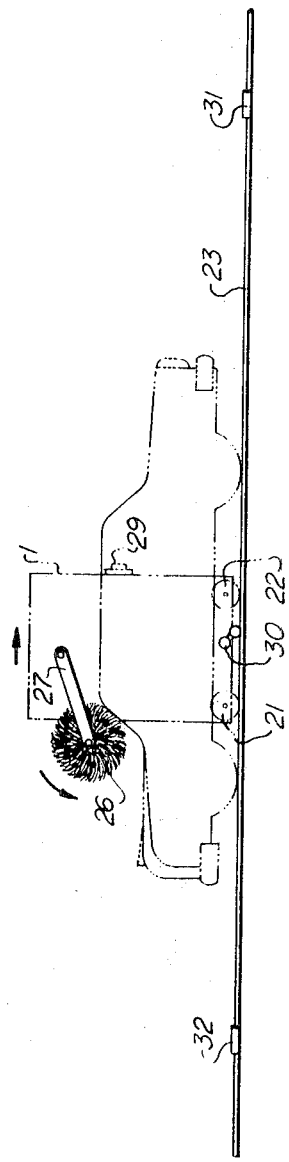

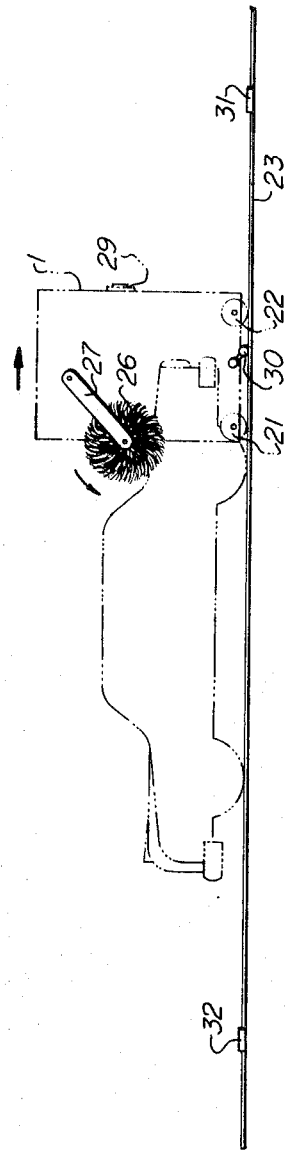
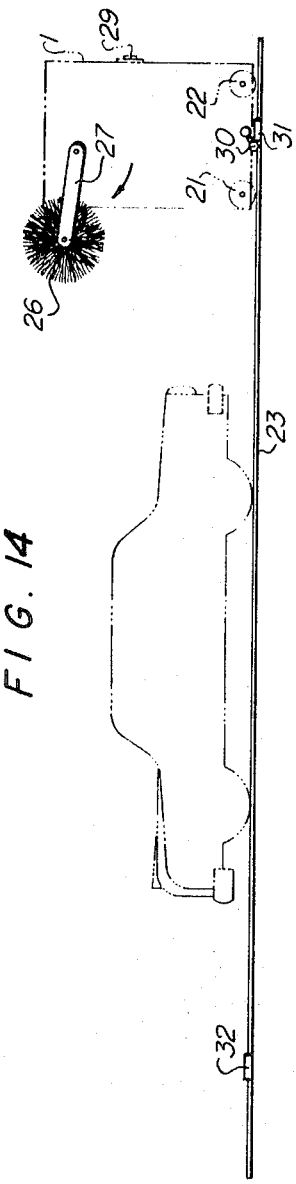

United States Patent Office 3,614,800
Patented Oct. 26, 1971

3,614,800
CAR BODY WASHING APPARATUS
Shigeo Takeuchi, Nagoya, Japan, assignor to Takeuchi Tekko Kabushiki Kaisha, Nagoya, Japan
Filed Apr. 3, 1969, Ser. No. 813,077
Claims priority, application Japan, Feb. 26, 1969, 44/13,938
Int. Cl. B60s 3/06
U.S. Cl. 15—21 E
1 Claim

ABSTRACT OF THE DISCLOSURE

An apparatus for washing a car body comprising a movable or fixed frame on which a pair of vertically disposed rotatable brushes are mounted by means of support mechanisms which are foldable to move the brushes in the lateral directions so that the brushes can be used to wash the front and rear surfaces of the car body as well as the side surfaces thereof.

BACKGROUND OF THE INVENTION

Field of the invention

The present invention relates to a car washing apparatus of a type which has rotatable brush means and can be suitably and efficiently used for washing car body of an automoble of various size and shape.

Description of prior art

Such an apparatus for washing car body of an automobile that has a plurality of rotatable brushes mounted on a fixed or movable frame and performs a washing operation by putting the brushes into contact with the car body and rotating them has been well known. In the apparatus of this type, the front and rear surfaces of the car body are washed by a brush which is rotatable about a horizontal axis and shiftable in the vertical direction. However, a recent automobile has at its front and rear surfaces many unevennesses provided by such as a front grill, bumpers, a radio antenna and ornamental protuberances. Therefore, the above described type of rotatable brush for washing the front and rear surfaces of a car body is not effective to perform a sufficient washing operation. Further, the known brush was disadvantageous in that it often entangled with a projection such as a radio antenna or the like and damage or break it.

SUMMARY OF THE INVENTION

The present invention has an object to solve the aforementioned disadvantages of the conventional apparatus and provides a car washing apparatus in which rotatable side brush means is so formed that it can positively contact with the front and rear surfaces as well as the side surfaces of a car body whereby even such a car body that has unevenness on its surface can be positively washed.

BRIEF DESCRIPTION OF THE DRAWINGS

The drawings show an embodiment of a car washing apparatus made in accordance with the present invention, in which.

FIG. 4 is an enlarged longitudinal sectional view of a side brush support;

FIG. 5 is a plan view of the parts shown in FIG. 4;

FIGS. 6 through 10 show a process in which the external peripheral surface of a car body is progressively washed by side brush means; and, FIGS. 11 through 14 show a process in which the roof portion of the car body is washed by an upper rotatable brush.

DESCRIPTION OF THE PREFERRED EMBODIMENT

Figure 1:
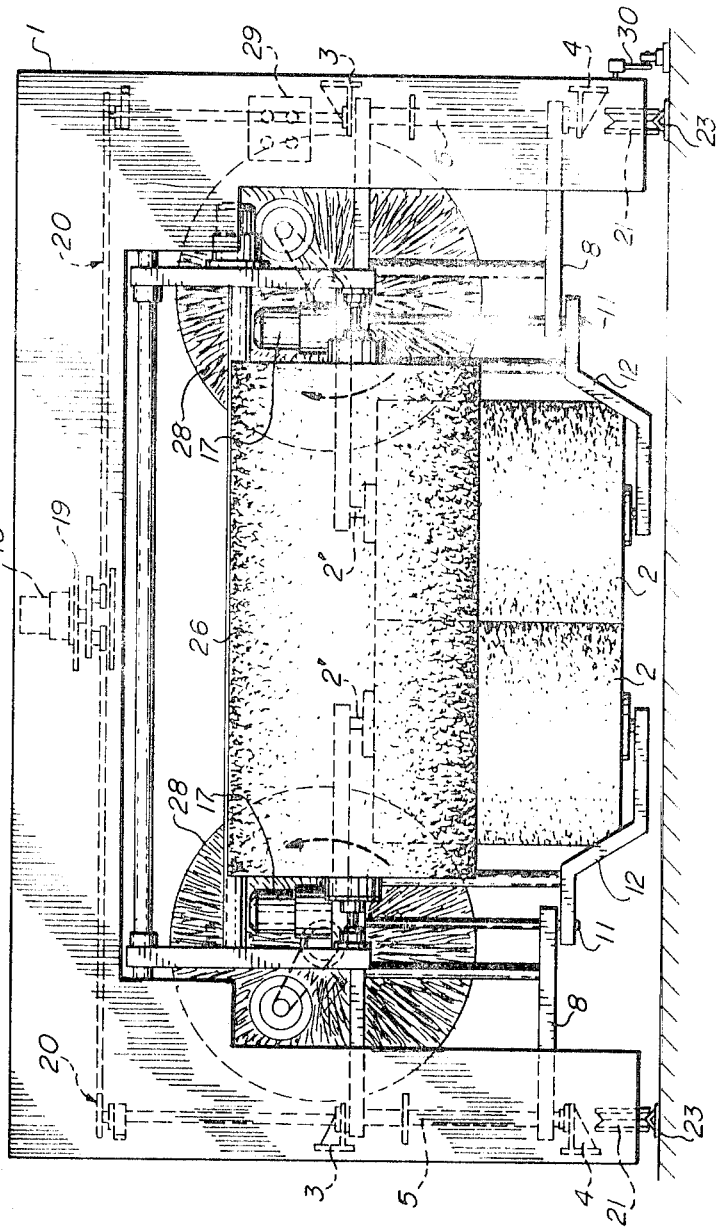
FIG. 1 is a front view of the apparatus made in accordance with the present invention.
Figure 2:
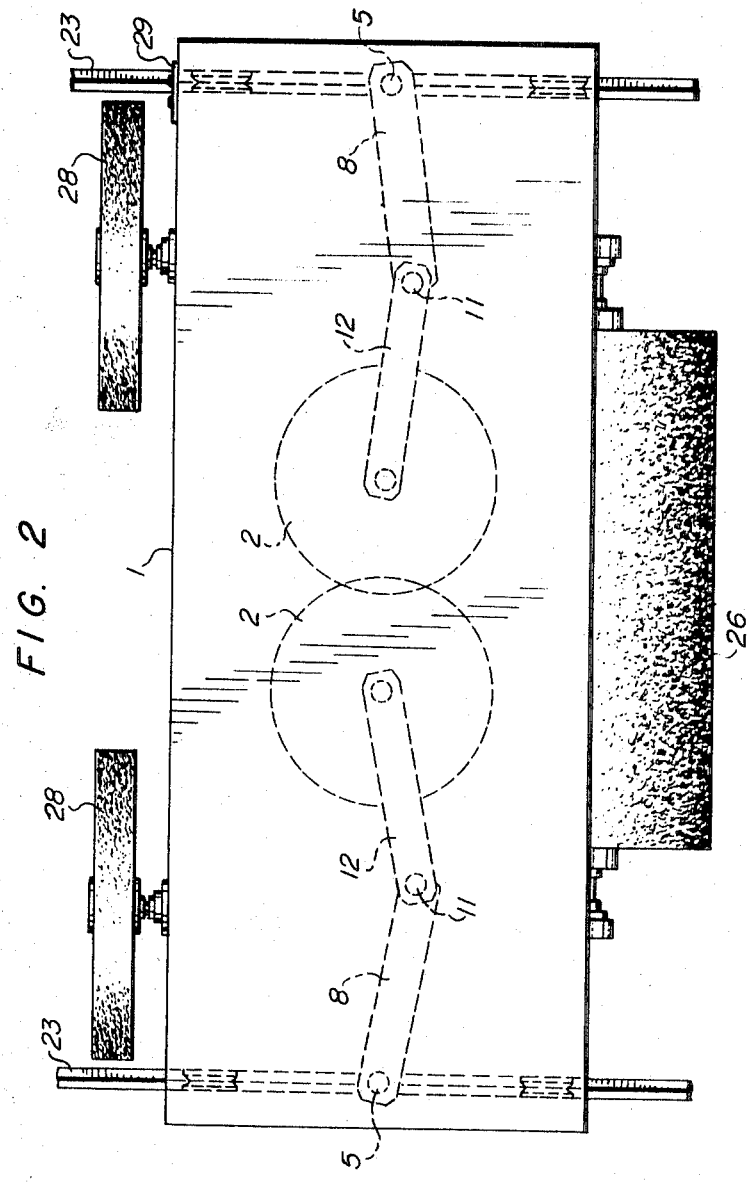
FIG. 2 is a plan view of the apparatus shown in FIG. 1.

The present invention will now be described taking reference to the accompanied drawings which show an embodiment of the present invention. In this embodiment, the present invention is embodied in a movable car washing apparatus in which washing means is provided in a movable frame which adapted to move along guide passage means.

Referring to the drawings, the apparatus has a pair of rotatable side brushes 2 and 2 for washing the front and rear surfaces as well as the side surfaces of an automobile car body. The brushes are mounted one on each side of a gate type movable frame 1 by means of support mechanisms. Each of the support mechanisms for the pair of rotatable side brushes 2 and 2 has an identical construction, so that only one of the support mechanisms will be hereinafter described. The support mechanism has a pair of opposed brackets 3 and 4 secured to the inner side surface of the movable frame 1. The brackets 3 and 4 have a support shaft 5 extending therebetween and secured thereto, on which shaft a frameworked swing arm 8 is swingably mounted by means of a pair of bearings 6 and 7. The swing arm 8 has at its free end a vertical shaft 11 which is rotatably mounted thereon through a pair of bearings 9 and 10. The vertical shaft 11 has a pair of bifurcated support arms 12 fixed one on each end of the shaft 11 for supporting the opposite ends of the shaft 2' of the rotatable side brush 2.

Within the framework of the swing arm 8, there is disposed a chain 15 which passes around a pair of chain sprockets 13 and 15 which are in turn keyed respectively to the support shaft 5 and the vertical shaft 11. At the root end of the swing arm 8, there is secured a chain sprocket 16 which is connected with a drive mechanism as will be described later.

Figure 3:
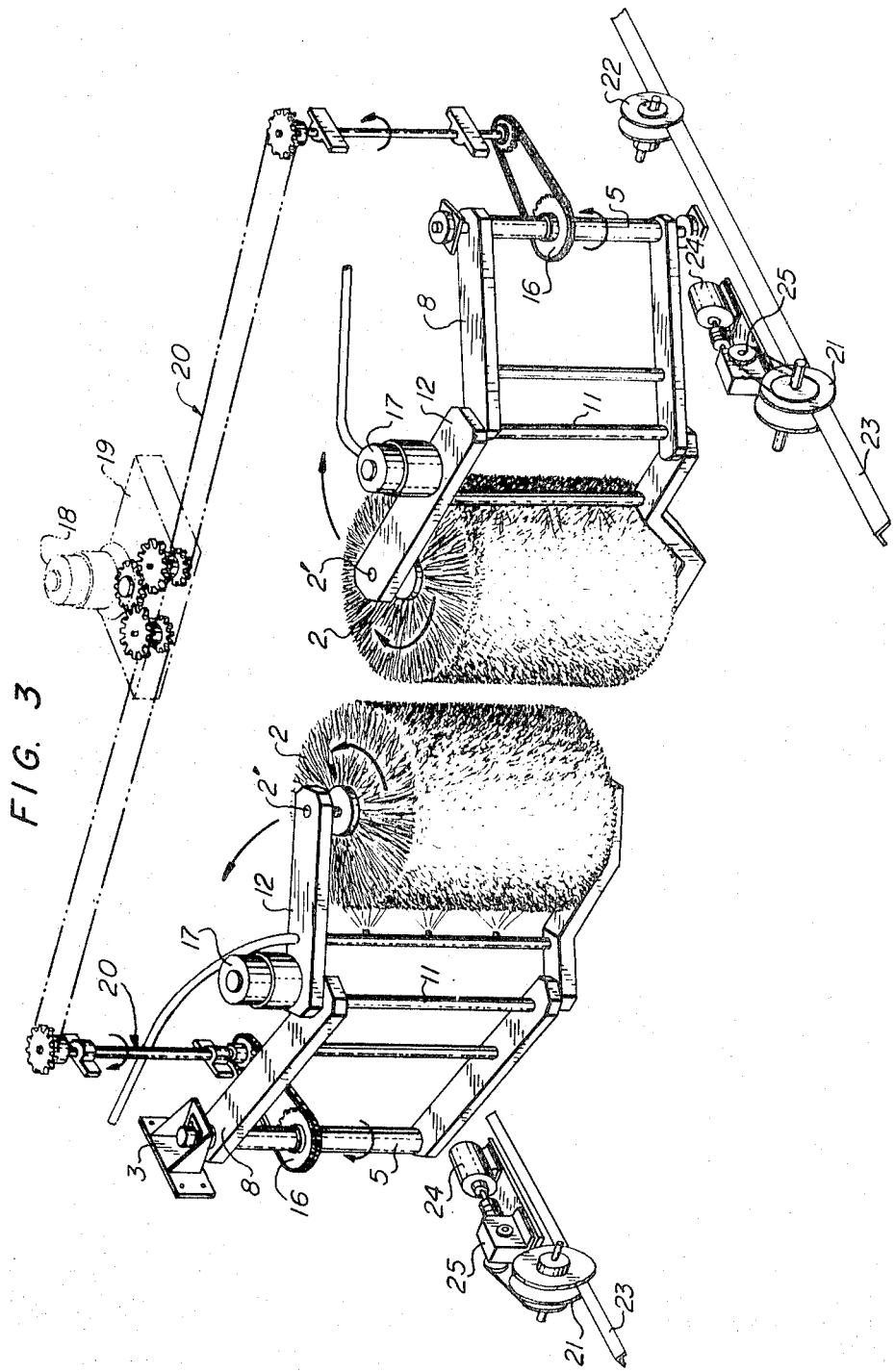
FIG. 3 is a perspective view of an important portion of the apparatus made in accordance with the present invention.

As apparently illustrated in FIG. 3, a geared motor 17 is mounted on the upper surface of said support arm 12. The motor 17 is connected through chain and sprocket means to the shaft 2' of said rotatable side brush 2, so that the rotation of the motor can positively drive the brush 2.

Another general motor 18 is mounted on the center portion of the ceiling of the movable frame 1 through a frame member 19. The geared motor 18 is connected with the chain sprocket 16 fixed on the root end of said swing arm 8 by means of a motor transmittng mechanism 20 comprising chain and sprocket means, so that the rotation of the geared motor 18 is effective to swing the arm 8 with respect to a line L—L which is defined by a line passing through the center axes of the support shaft 5 and the vertical shaft 11 and projected on the side wall of the mobile frame 1.

The gate type movable frame 1 has a pair of leg portions on which a pair of driving wheels 21 and a pair of freely rotatable wheels 22 arranged rotatably move on a pair of parallel rails 23. The driving wheels 21 are driven by means of a motor 24 through a speed reduction mechanism 25, and the movable frame 1 is reciprocated on the rails 23 through the control of the motor 24.

In the drawings, the reference numeral 26 shows an upper rotating brush for washing the upper surface of the car body of an automobile, and 27 a vertically swingable support arm for the rotatable brush 26. The reference numerals 28 and 28 show upper window brushes, 29 a push button switch for an electrical solenoid valve which controls a pressurized water jet discharged toward each of the brushes, 30 a limit switch for controlling the movable frame 1 and each of the rotatable brushes, and 31 and 32 show actuator pieces for the limit switch.

The operation of the rotatable side brushes 2 and 2 will now be described with reference to FIGS. 3 to 5. When the geared motor 18 is started, the chain sprocket 16 is driven through the motion transmitting mechanism 20 in the counter-clockwise direction as seen by the arrows in FIGS. 3 and 5. Then, the swing arm 8 which is fixed to the chain sprocket 16 is also rotated counter-clockwise as shown by the arrow A in FIG. 5 about the support shaft 5.

When the swing arm 8 is thus rotated, the chain sprocket 14 is also rotated by the chain 22 which is stretched between the chain sprockets 13 and 14 in the clockwise direction as shown by the arrows in FIG. 5 and thus the vertical shaft 11 which is fixed to the chain sprocket 14 is rotated in the same direction. Since the support arms 12 are secured to the opposite ends of the vertical shaft 11, they are swung clockwise as shown by the arrow B in FIG. 5 about the axis of the vertical shaft 11. Thus, the swing arm 8 and the support arms 12 are swung always in the opposite directions with each other through the same angle, so that the side brush 2 supported at the ends of the support arms 12 can be moved to be folded or extended along the line L—L defined on the side wall of the movable frame 1 as shown in FIG. 5. Further, it is also possible by reversing the rotation of the geared motor 18 to fold the arms 8 and 12 in the direction opposite to that shown in FIG. 5. Thus, the folding angle and the folding direction can be readily adjusted through the control of the geared motor 18.

The process in which the front, rear and side surfaces of the automobile body are washed by using the apparatus of the present invention will now be described taking reference to FIGS. 6 to 10. The car to be washed is placed between the rails 23 and 23, and the push button switch 29 is depressed to discharge pressurized water to each of the rotatable brushes 2, 26 and 28. At the same time, the side brushes 2 and 2 are rotated in the directions shown by the arrows, and the brush elements are radially extended due to the centrifugal force acting thereon. In the meantime, the movable frame 1 is moved along the rails 23 and 23 from the front part to the rear part of the car. As soon as the frame 1 is started to move, the swing arms 8 and 8 and the support arms 12 and 12 supporting the pair of rotatable side brushes 2 and 2 are gradually extended by the geared motor 18 from the folded position shown in FIG. 6 toward the center of the apparatus as shown in FIG. 7, so that the side brushes 2 and 2 contact with each other at their outer periphery. In this latter position, the frame 1 is further moved, and the side brushes 2 and 2 are put into contact with the front surface of the car body.

Then, as the frame 1 is further moved, the swing arms 8 and the support arms 12 are pushed in the direction reverse to that of the frame movement. The displacement of the arms 8 and 12 are detected and used to automatically stop the movement of the movable frame 1, or the frame 1 may be stopped by a suitable manual operation. At the same time, the rotation of the geared motor 18 is reversed by the actuation of magnetic relay means, whereby the swing arms 8 and the support arms 12 are folded to move the rotatable brushes 2 and 2 laterally from the position shown by the full line in FIG. 7 to that shown by the chain line. During this period, the front surface of the car including a front grill and a bumper is washed by the brush means moving from the center part thereof to the opposite sides.

The rotatable brushes 2 and 2 are stopped at lateral positions in which they can contact with the side surfaces of the car body. Then, the movable frame 1 is again automatically or manually started to move, whereby the rotatable brushes 2 and 2 are moved washing the opposite sides of the car body as shown in FIG. 8.

Thus, when the movable frame 1 reaches the end of the stroke, the limit switch 30 is actuated by the actuator piece 31 as shown in FIG. 9 whereby the movable frame 1 is stopped. At the same time, the rotation of the rotatable side brushes 2 and 2 is also stopped.

In this position, the geared motor 18 is rotated in the direction reverse to that of the initial rotation. Then, the swing arms 8 and the support arms 12 are gradually extended from the folded position and thereafter folded in the reverse direction, i.e., to the position symmetrical to that of the initial fold as shown in FIG. 10. During this period, the side brushes 2 and 2 are stopped and do not interfere with the above described operation.

Then, the side brushes 2 and 2 on the movable frame 1 is rotated in the direction reverse to that of the initial stroke through the electrical control of the driving motor 24.

The movable frame 1 is reversely moved from the rear side to the front side of the automobile, and the rotatable brushes 2 and 2 washes the rear surfaces of the car body including a bumper and a rear trunk, as shown by the full line in FIG. 10, in a quite similar way to the aforementioned washing of the front surface of the car. Thereafter, the side surfaces of the car body are again washed and the movable frame 1 is returned to the position shown in FIG. 6. In this position, the limit switch 30 is actuated by the actuator piece 32 to stop the movement of the frame 1 and the rotation of the side brushes 2 and 2. Thus, the whole strokes of washing operation are completed.

FIGS. 11 to 14 show the process of washing the upper surface of the car body. Referring to these figures, the upper rotatable brush 26 is rotated in the direction indicated by an arrow together with said side brushes 2 and 2 by depressing the push button switch 29. As the movable fame 1 is moved, the brush 26 is put into contact with the upper surface of the car body with a suitable pressure as shown in FIGS. 11 to 13 to perform washing operation. When the movable frame 1 reaches the rear end of its stroke as shown in FIG. 14 and the limit switch 30 is actuated by the actuator piece 31, the upper brush 26 is stopped to rotate and maintained in a raised position by an air cylinder means or the like throughout the return stroke of the movable frame 1, so that it does not contact with the car body during the return stroke.

While the present invention has been described with respect to an embodiment in which washing means is equipped in a movable frame, the means can also be equipped in a fixed frame.

As described above, according to the present invention, a pair of rotatable side brushes are vertically supported by support mechanisms on the opposite side walls of a movable or fixed frame so that they can move along the front or rear surface of a car body, and the support mechanisms for the pair of rotatable side brushes can be of identical construction. Therefore, the apparatus of the present invention can effectively wash even an uneven portion such as the front or rear surface which has a front grill, a bumper, a rear trunk or other uneven parts. Further, according to the present invention, since the side brushes can be used to wash the front and rear surfaces as well as side surfaces of the car body, the construction is very simple.

Moreover, in the apparatus of the present invention, the brush elements do not come to be entangled with a projection such as a radio antenna or the like as often experienced in a conventional washing apparatus. Fur-

What is claimed is:

1. An apparatus for washing a car body, said apparatus comprises a frame having opposite sidewalls, one of a pair of swing arms pivotally mounted on each of said opposite side walls of said frame, support arm means rotatably supported at the free end of each of said swing arms, each support arm means having a rotatable side brush disposed vertically thereon, the arrangement being such that said support arm means can be rotated in the direction opposite to that of the corresponding swing arm but through an angle which is the same as the rotational angle of the corresponding swing arm whereby each of said rotatable side brushes can be shifted in the lateral direction, each said swing arm supported at one end by a support shaft which is in turn supported by a pair of spaced brackets secured to each side wall of said frame, the other end of said swing arm being connected with the end of the support arm opposite to the end to which said brush is attached through a vertical shaft, said vertical shaft secured to said support arm, each said swing arm having at its root end a chain sprocket fixed thereto and rotated by power means, said apparatus further comprising a pair of chain sprockets with one of said chain sprockets secured to said vertical shaft and the other of said pair of chain sprockets secured to said support shaft, an endless chain disposed between said pair of chain sprockets whereby said swing arm and said support arms can be rotated in the directions opposite with each other through the same angle of rotation so that the brush can be shifted laterally.

References Cited

UNITED STATES PATENTS

| | | | |
|---|---|---|---|
| 3,310,824 | 3/1967 | Beer | 15—21 (C.3) |
| 3,403,416 | 10/1968 | Hurwitz | 15—21 (C.3) |

FOREIGN PATENTS

| | | | |
|---|---|---|---|
| 1,154,728 | 9/1963 | Germany | 15—CCP |
| 892,598 | 3/1962 | Great Britain | 15—CCP |

EDWARD L. ROBERTS, Primary Examiner

U.S. Cl. X.R.

15—53